(12) United States Patent
Grönninger et al.

(10) Patent No.: US 7,669,932 B1
(45) Date of Patent: Mar. 2, 2010

(54) HEADREST

(75) Inventors: Reinhold Grönninger, Maxhütte/Haidhof (DE); Svan Spielmann, Gelenau (DE); Thomas Leneis, Reithofen (DE)

(73) Assignee: Grammer A.G., Riverdale (Bronx), NY (US)

( * ) Notice: Subject to any disclaimer, the term of this patent is extended or adjusted under 35 U.S.C. 154(b) by 437 days.

(21) Appl. No.: 11/364,805

(22) Filed: Feb. 28, 2006

(51) Int. Cl.
*A47C 7/36* (2006.01)
(52) U.S. Cl. .................................. 297/408; 297/216.12
(58) Field of Classification Search ................ 297/408, 297/216.12, 367
See application file for complete search history.

(56) References Cited

U.S. PATENT DOCUMENTS

| | | | | |
|---|---|---|---|---|
| 4,795,213 | A * | 1/1989 | Bell | 297/367 |
| 4,836,608 | A * | 6/1989 | Sugiyama | 297/367 |
| 4,872,726 | A * | 10/1989 | White et al. | 297/367 |
| 5,669,668 | A * | 9/1997 | Leuchtmann | 297/408 |
| 6,068,337 | A * | 5/2000 | De Filippo | 297/391 |
| 6,129,421 | A * | 10/2000 | Gilson et al. | 297/408 |
| 6,302,485 | B1 * | 10/2001 | Nakane et al. | 297/408 |
| 6,880,890 | B1 * | 4/2005 | DeBrabant | 297/408 |
| 6,910,740 | B2 * | 6/2005 | Baker et al. | 297/408 |
| 7,055,909 | B2 * | 6/2006 | Wu | 297/408 |
| 7,073,863 | B1 * | 7/2006 | Low et al. | 297/404 |
| 7,306,287 | B2 * | 12/2007 | Linardi et al. | 297/410 |
| 7,322,646 | B2 * | 1/2008 | Jammalamadaka et al. | 297/216.12 |
| 2004/0108766 | A1 * | 6/2004 | Baker et al. | 297/408 |
| 2005/0029853 | A1 * | 2/2005 | Gauthier et al. | 297/408 |
| 2005/0067874 | A1 * | 3/2005 | Kamrath et al. | 297/408 |
| 2005/0088027 | A1 * | 4/2005 | Yetukuri et al. | 297/408 |
| 2006/0012233 | A1 * | 1/2006 | Karlberg | 297/408 |
| 2006/0226689 | A1 * | 10/2006 | Linnenbrink et al. | 297/408 |
| 2006/0226690 | A1 * | 10/2006 | Neale | 297/408 |
| 2007/0001500 | A1 * | 1/2007 | Kraft et al. | 297/408 |
| 2007/0158990 | A1 * | 7/2007 | Hermansson et al. | 297/408 |
| 2007/0164593 | A1 * | 7/2007 | Brockman | 297/408 |
| 2007/0284929 | A1 * | 12/2007 | Keller et al. | 297/408 |

* cited by examiner

*Primary Examiner*—Sarah B McPartlin
(74) *Attorney, Agent, or Firm*—Andrew Wilford (57) ABSTRACT

A vehicle headrest has a support defining a horizontal pivot axis and a cushion having a front face and pivotal about the axis on the support between a use position with the face upright and a rest position with the face generally horizontal. A latch element is displaceable in a longitudinal direction relative to the cushion between a blocking position operatively engaging the cushion and preventing the cushion from pivoting from the use position into the rest position and an unblocking position permitting such pivoting. A separate safety element engageable with the latch element is displaceable in a transverse direction between a locking position operatively engaging the latch element and preventing movement of the latch element into the unblocking position and a releasing position permitting movement of the latch element into the unblocking position.

11 Claims, 7 Drawing Sheets

HEADREST

FIELD OF THE INVENTION

The invention relates to a headrest for vehicle seats having a cushion that is pivotable about a horizontal axis from an approximately horizontal rest position of its headrest face into an approximately vertical use position in which the cushion is braced by an abutment and at least one latch element shiftable between a blocking position preventing pivoting of the cushion into the rest position and an unblocking position permitting such pivoting.

BACKGROUND OF THE INVENTION

Such a headrest is known from DE 102 36 259. The headrest is pivotally attached to a support bow so that it can swivel between a substantially vertical use position and a horizontal rest position. In the use position, a locking holder that is displaceably attached to the cushion is supported by an abutment of support rods and blocks a pivoting into the rest position. By displacing the latch element, the abutments of the locking holder move away from their support points on the carrying rods. The headrest can thus be swiveled into its rest position. This prior art that otherwise is advantageous, should be improved insofar as the locking holder can move unintentionally into a position that enables pivoting of the headrest. Such case can for example be caused by inertial mass force impact that can occur during a vehicle crash.

OBJECT OF THE INVENTION

The object of the invention on the basis of the last mentioned prior art consists in creating a pivotable headrest that is further improved with respect to safety.

SUMMARY OF THE INVENTION

The invention attains this object in that a safety device is provided that is movable between a locking position and a releasing position, the safety device holding the latch element in the blocking position in a locking position and in the unblocking position in a pivoted position that enables the headrest to rotate down into the rest position.

Thus, the principle of the invention substantially consists in the fact that in the use position of the headrest the latch element is held in the locking position firmly attached by the safety device and cannot move unintentionally into the pivoted position from this position. The locking holder can be moved into its pivoted position solely by the intentional movement of the safety device into a releasing position, so that the headrest can rotate down into the rest position.

The advantage of the invention thus substantially consists in the fact that even in the case of high mass inertia forces occurring, such as for example in a vehicle crash, the locking holder is always held firmly attached in its blocked position, so that the headrest cannot swivel unintentionally into the rest position. In particular in a crash, it is necessary that the headrest remains in the use position and does not swivel into the rest position unintentionally. Only in this manner, can it be assured that it attains its object and provides support for the head of the passenger, necessary for reasons of safety. The headrest according to the invention thus contributes to increasing the safety of the passenger.

According to a first embodiment, the safety device has a holding element that is at least indirectly fixedly attached to the cushion and an engaging element that is at least indirectly fixedly attached to the latch element. The interaction of holding and engaging element prevent the latch element from moving into its pivoted position in the rest position.

According to a further embodiment of the invention, the holding element has positive locking means that interact in the rest position of the headrest with the engaging element. By means of the positive locking means, the engaging element can be held in the rest position of the headrest in a simple and thus economic manner firmly in the blocking position. Furthermore, by means of the positive locking, a secure connection between engaging element and holding element can be created. Alternatively, also a non-positive connection between the engaging element and the holding element in the rest position of the headrest would be possible.

According to another embodiment of the invention, the positive locking means of the holding element are formed by a U-shaped part with a first abutment and a second abutment that is located at a spacing therefrom. The latch element can thus be interlocked in the rest position of the headrest between the two abutments of the U-shaped part, so that the latch element cannot move into the pivoted position. Only movement of the U-shaped part out of the path of the engaging element enables displacement of the latch element into the pivoted position and thus pivoting of the headrest.

According to another embodiment of the invention, there is some play allowing movement of the engaging element in the blocking position of the safety device between the first abutment and the second abutment of the U-shaped part. In this way, no wedging of the engaging element between the two abutments can occur, so that the safety device can always be moved operationally reliably between the blocking position and the releasing position. Furthermore, this embodiment offers the possibility of simultaneous movement of the safety device into the releasing position and of the latch element into the pivoted position. If there was no play allowing movement, the latch element could only be brought into the pivoted position after the movement of the safety device into the releasing position.

According to a further embodiment of the invention, the holding element is formed by a first spring element. The spring element can be formed by a spring steel and can thus be easily and economically fabricated. Alternatively, it would also be possible that the holding element represents a fixed part that can for example have positive locking means and that can be forced under load by a spring element into the locking position.

According to a further embodiment of the invention, the engaging element is formed by a locking slide. This locking slide can be directly formed on the latch element. The locking slide and latch element can be fabricated in an easy manner in one piece, for example by plastic injection molding. Alternatively, it would also be possible for the locking slide to be attached to the latch element.

According to a further embodiment of the invention, the latch element is movable by means of an actuator between the locking and the pivoted position. This embodiment has the advantage that actuation of the latch element is independent of where it is mounted. Furthermore, for example the additional task can be assumed of moving the safety device from the blocking position into the releasing position by means of the actuator, as already mentioned above.

According to a further embodiment of the invention, the actuator is formed by an actuating button that acts at least indirectly upon an actuating rod. By means of this design, it is easily possible to adapt the actuating button to the appearance of the headrest and to fabricate the possibly not visible actuating rod independently thereof.

According to a further embodiment of the invention, the actuator and the latch element are connected to each other at least indirectly with some lost motion. In this way, the fabrication tolerances can be compensated more easily, so that a secure function of the headrest is permanently assured. The connection can for example be achieved by means of a stud that is formed on the actuator that engages in a positive locking manner into an opening in the latch element.

According to a further embodiment of the invention, the actuator is provided with a bevel which for unlocking the latch element interacts with an angled face of the holding element, wherein by actuation of the actuator the holding element is movable out of the movement trajectory of the latch element. Thus, it is possible to separate the interaction of the holding element and engaging element by moving the holding element out of the path of the engaging element. The actuator has a double function. On the one hand, it causes the safety device to be moved from the blocking position into the release position and, on the other hand, it causes the latch element to be displaced from the locking position into the pivoted position.

According to a further embodiment of the invention, a second spring element is assigned to the latch element that forces the latch element into its locking position. In this way, the latch element is always forced under load into its locking position. Furthermore, the latch element can be moved automatically into the blocking position after pivoting of the headrest into the use position by the second spring element, so the engaging element can lock into the holding element.

According to a further embodiment of the invention, the latch element is supported by the support rods in the use position of the headrest. The existing support rods form a counter bearing that reliably avoids pivoting of the headrest in the use position. On the latch element, supports can be formed that interact with bearings that are provided on the support rods.

According to a further embodiment of the invention, the latch element in the use position of the headrest is supported by a blocking element that is attached in an nonpivotal manner to a connecting bar that bridges the support rods. In this embodiment, a blocking element is attached to a connecting bar that bridges the two support rods and that is for example provided with abutments against which the latch element engages in the use position of the headrest. When the latch element is moved into the pivoted position, the blocking element no longer is in the path of the latch element, so that the headrest is pivotable.

BRIEF DESCRIPTION OF THE DRAWING

Further advantages of the invention result from the following description of an example of embodiment shown in the drawings. Therein.

SPECIFIC DESCRIPTION

Figure 1:
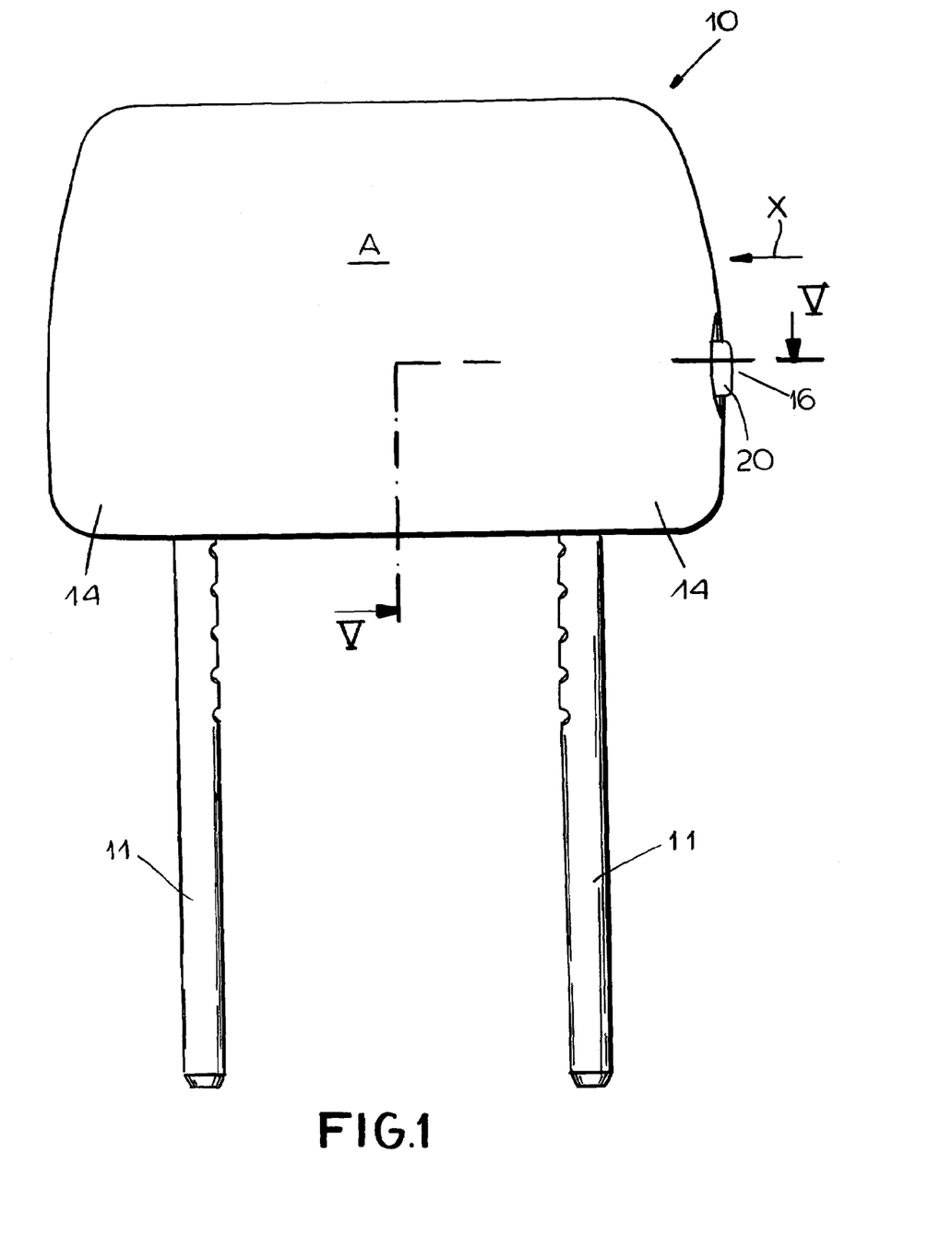
FIG. 1 is a front view of the headrest according to the invention in use position.
Figure 2:
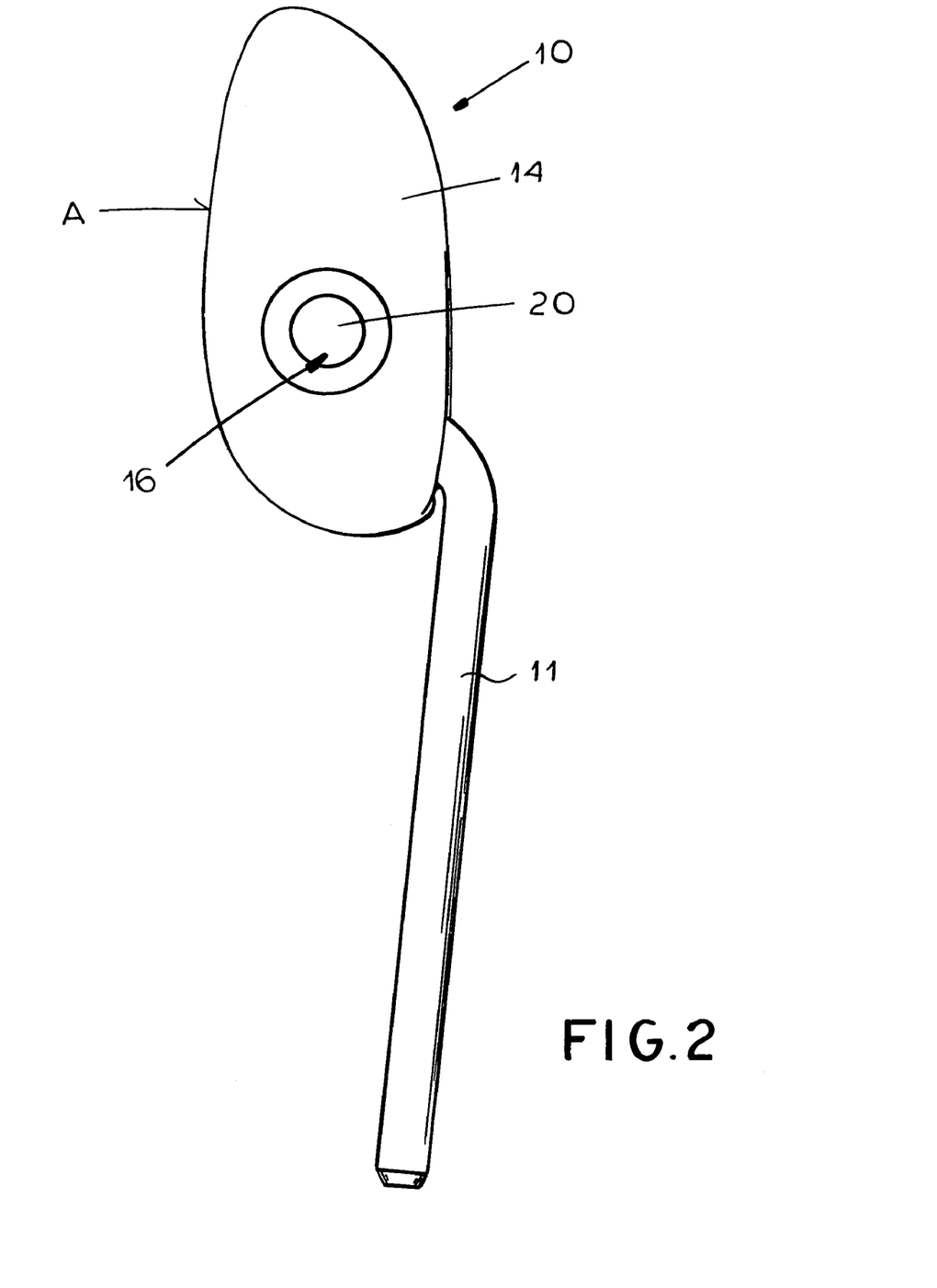
FIG. 2 is a side view of the headrest according to FIG. 1.
Figure 4:
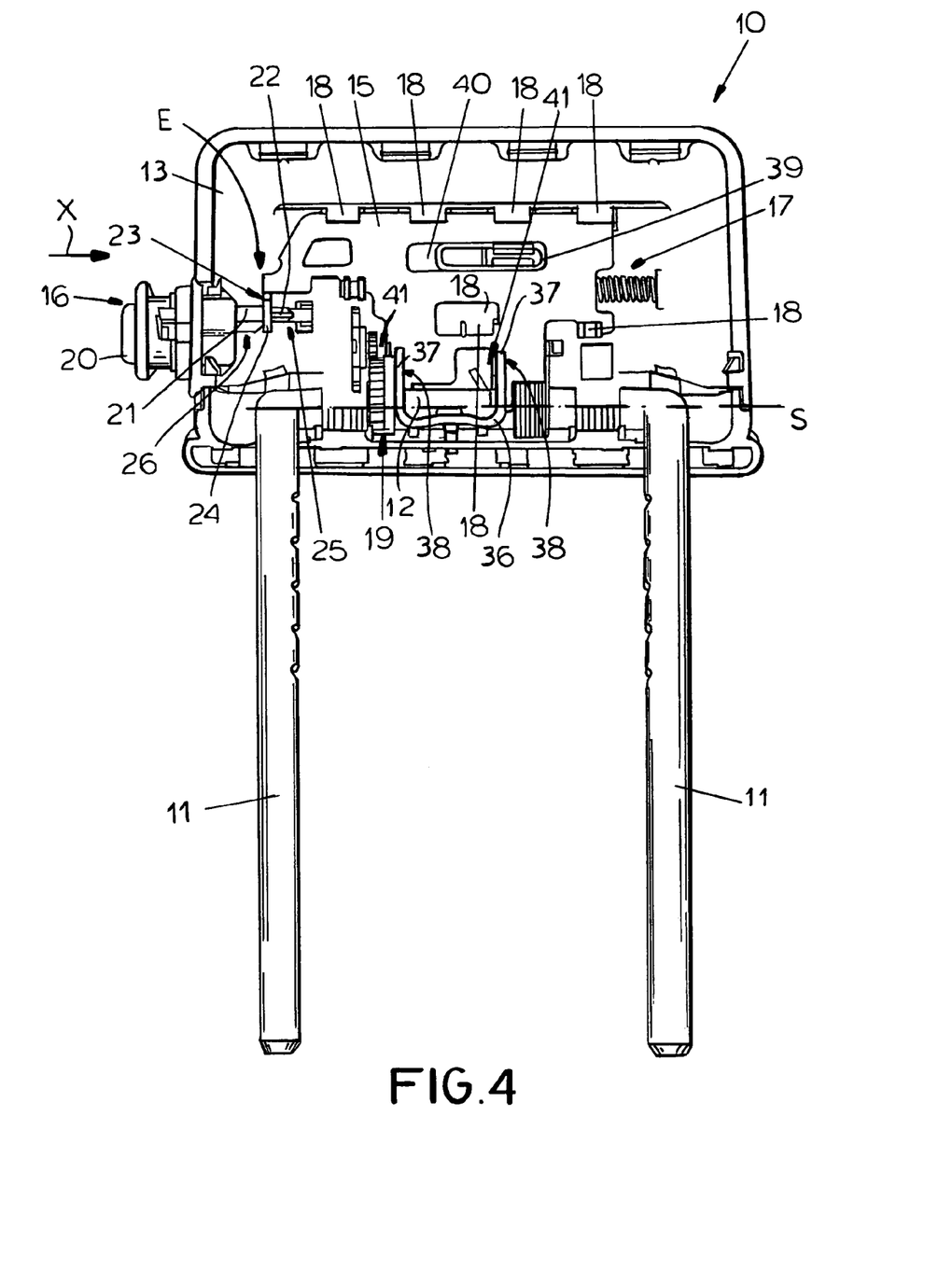
FIG. 4 is a rear view of the headrest according to the invention with the back cover of the headrest removed.

In FIGS. 1 and 2, a headrest 10 is shown in its vertical use position. The headrest 10 is attached by means of support rods 11 in guide bushes that are not shown of an also unillustrated seat back. The support rods 11 are connected to each other by a connecting bar 12 (see FIG. 4). The connecting bar 12 pivotally supports a cushion support 13 about a pivot axis S. The cushion support 13 is provided with a cushion 14 that has a head supporting surface A for an unillustrated head of a vehicle passenger.

Figure 3:
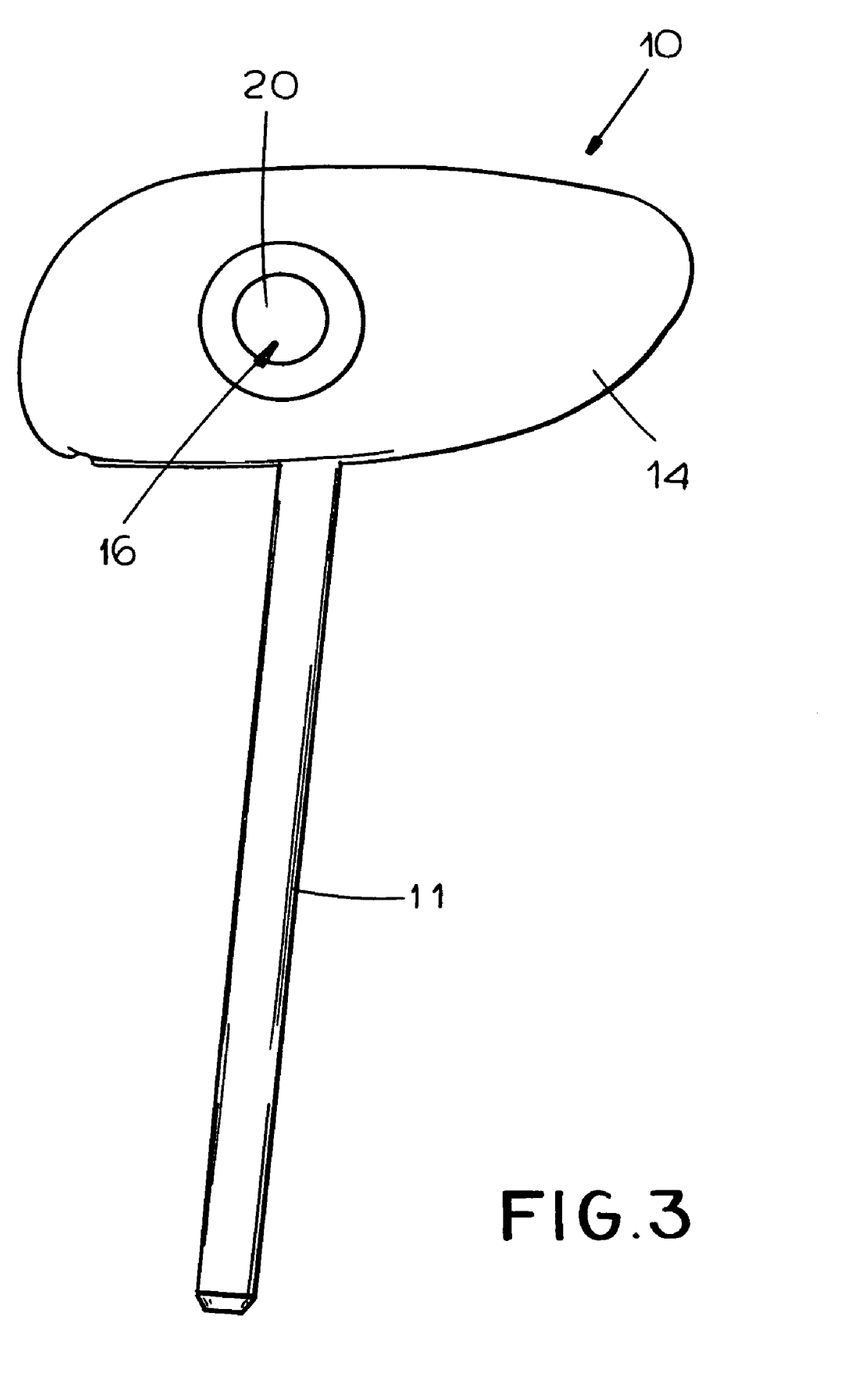
FIG. 3 shows the headrest according to FIG. 2 in the rest position.

An actuator 16 supports the headrest 10 for pivoting from the use position of FIGS. 1 and 2 into the rest position shown in FIG. 3. Locking of the headrest 10 in the use position is effected by means of a latch element 15. The latch element 15 has according to FIG. 4 blocking faces 38 that bear in the use position of the headrest 10 against abutment arms 37 of a blocking element 36 and thus prevent pivoting of the headrest 10. The blocking element 36 itself is attached in an nonpivotal manner to the connecting bar 12.

The latch element 15 is carried in guides 18 for straight-line movement parallel to a pivot axis S of the cushion support 13. The displaceability of the latch element 15 is additionally affected by a catch 39 that is formed on the cushion support 13 that engages into an elongated hole 40 of the latch element 15. The latch element 15 is biased by a prestressed coil spring 17 into a locking position.

Figure 5:
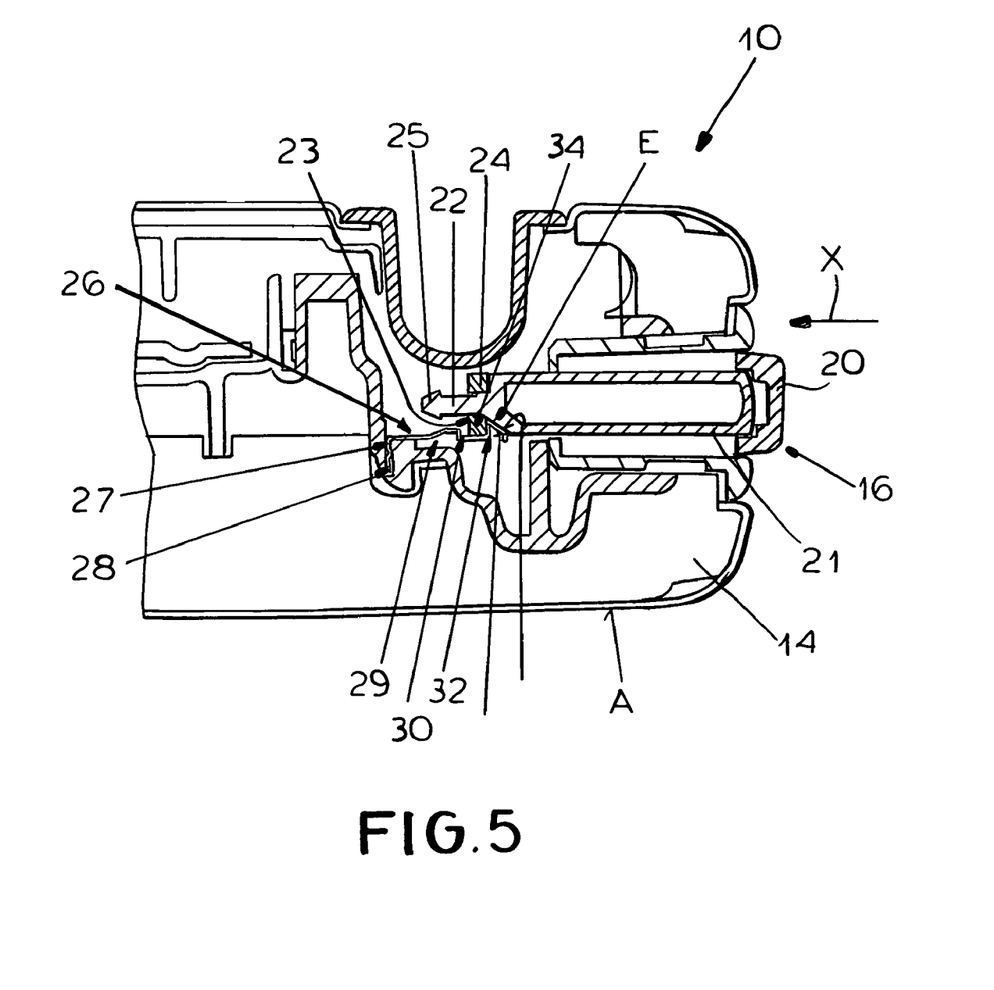
FIG. 5 is a cross section of the headrest according to section line V-V of FIG. 1 when the pushbutton is not actuated.

The actuator 16 of the latch element 15 is shown in FIG. 5 in an unactuated position. The actuator 16 has an actuating button 20 as well as an actuating rod 21 on which is unitarily formed a stud 22 that is at the opposite end from the actuating button 20. The stud 22 fits in a seat 23 of a slide 24 that is attached to the latch element 15. The stud 22 cannot move out of the seat 23 since on the end of the stud there is a laterally projecting bead 25. The bead 25 and an abutment face 35 of the actuating rod 21 for the slide 24 allow some play to compensate for fabrication tolerances. When the actuating button 20 is moved in a longitudinal direction x, the actuating rod 21 as well as the slide 24 and the latch element 15 that is connected as one piece with the slide 24 are displaced against the force of the coil spring 17 in the longitudinal direction x.

To prevent the latch element 15 from moving for example due to high mass inertia forces, such as occurring for example in a crash, unintentionally out of the locking position that holds the headrest in the use position, a holding spring 26 is attached to the cushion support 13. The holding spring 26 is anchored by an end portion 27 in a seat 28 of the cushion support 13. The end portion 27 can for example also be wedged in the seat 28 or can be attached therein in a positive locking manner. Also alternative fixing possibilities, such as for example gluing, are possible. The holding spring 26 has a bead 29 on which an abutment 30 is formed. Opposite the abutment 30 is a further abutment 32. Between the abutments 30 and 32, a U-shaped part 34 is provided. Furthermore, the holding spring 26 has an angled face 31 that interacts with a bevel 33 of the actuating rod 21.

Figure 6:
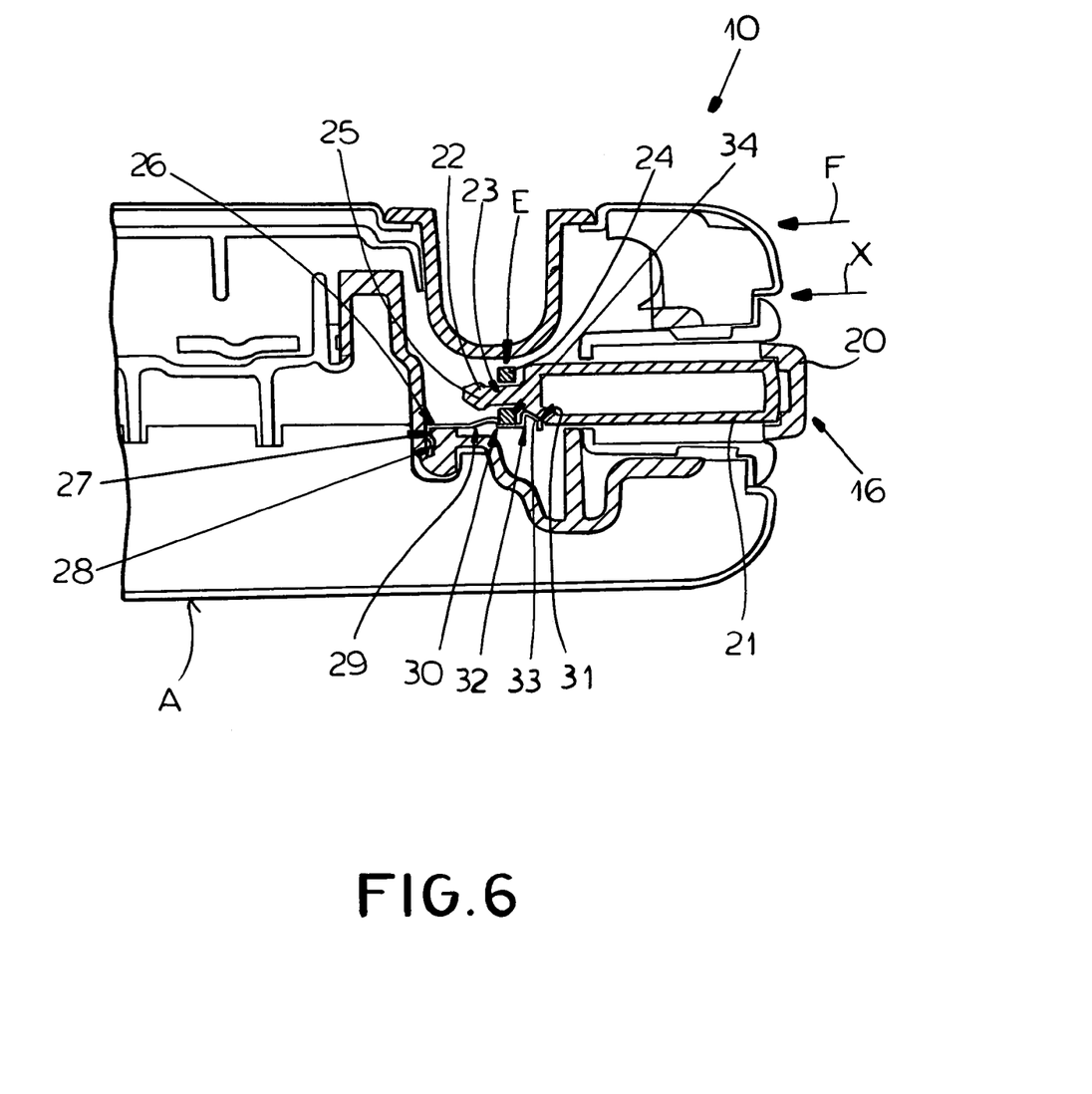
FIG. 6 is a cross section of the headrest according to section line V-V in the event of a crash.

In the following, the function of the holding spring 26 shall be discussed:

In the use position of the headrest 10 according to FIG. 5, the slide 24 is pressed by the coil spring 17 against the abutment 32 of the holding spring 26. In a crash, a mass inertia force F occurs (see FIG. 6), and the slide 24 is moved against the force of the coil spring 17 in the direction x until the slide 24 engages the abutment 30 as shown in FIG. 6. The slide 24 is thus locked in the use position of the headrest 10 between the abutments 30 and 32 and can only move with a minor play in the actuating direction x. Thus in the event of a crash, the latch element 15 cannot move out of the position that locks the headrest 10, so that the headrest 10 remains in the use position.

Figure 7:
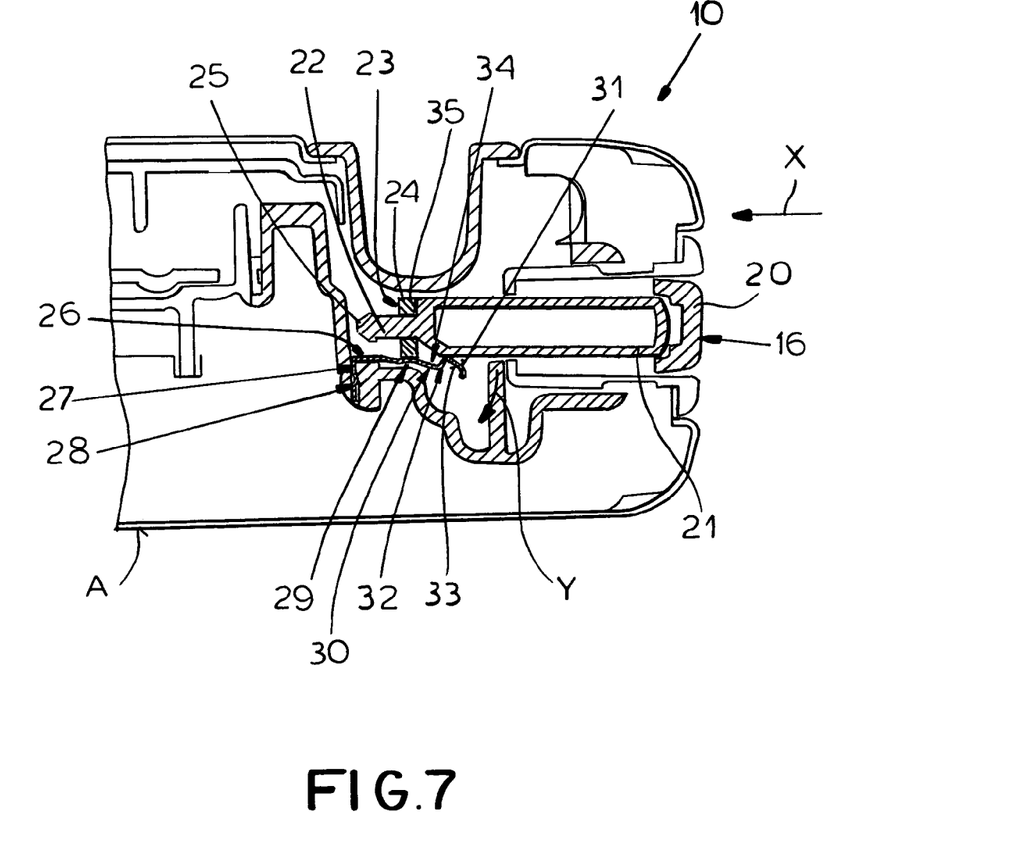
FIG. 7 is a cross section of the headrest according to section line V-V when the pushbutton is actuated.

Pivoting of the headrest 10 is effected by actuation of the actuating button 20, which also moves the actuating rod 21 in the direction x and the bevel 33 presses the angled face 31 of the holding spring 26 in the transverse direction of arrow y (see FIG. 7). The holding spring 26 is moved by this process out of the path of the slide 24, so that the latch element 15 can be moved from the locking position into the releasing position, which is shown in FIG. 7. In the releasing position of the latch element 15, the abutment arms 37 are aligned with cutouts 41 of the latch element 15, so that pivoting of the headrest 10 is possible. In order that the headrest 10 can pivot into the rest position in a damped manner, a viscosity brake 19 is provided.

Actuation of the device 16 provokes, as explained above, movement of the slide 24 in the longitudinal direction x and a movement of the holding spring 26 in the transverse direction y. In order that these two movements can take place simultaneously, the dimension of the U-shaped part 34 is designed such that between the abutments 30 and 32, there is some play allowing movement for the slide 24.

Alternatively, there is also the unillustrated possibility of moving at first the holding spring in the direction y and subsequently performing the movement of the actuating rod in the direction x.

After pivoting the headrest 10 from the rest position into the use position, the latch element 15 of the coil spring 17 is moved against the direction x, so that the slide 24 locks into the U-shaped part 34 of the holding spring 26 and thus, the headrest 10 is secured against unintentional pivoting.

The invention claimed is:

1. A vehicle headrest comprising:
    a support defining a horizontal pivot axis;
    a cushion having a front face and pivotal about the axis on the support between a use position with the face upright and a rest position with the face generally horizontal;
    a slide displaceable in a straight line in a longitudinal direction and substantially parallel to the axis relative to the cushion between a blocking position operatively engaging the cushion and preventing the cushion from pivoting about the axis from the use position into the rest position and an unblocking position permitting such pivoting;
    a first spring urging the slide in the longitudinal direction into the blocking position;
    a safety element engageable with the slide and displaceable in a transverse direction generally perpendicular to the axis between a locking position operatively engaging the slide and preventing movement of the slide into the unblocking position and a releasing position permitting movement of the slide into the unblocking position; and
    a second spring bearing transversely of the axis on the safety element and urging the safety element into the locking position.

2. The vehicle headrest defined in claim 1 wherein the safety element has a part fixed on the cushion and engageable with a part of the slide.

3. The vehicle headrest defined in claim 2 wherein the part of the safety element fits in the blocking position with the part of the slide.

4. The vehicle headrest defined in claim 3 wherein in the blocking position the parts of the safety element and of the slide can move limitedly relative to each other.

5. The vehicle headrest defined in claim 4 wherein the safety-element part has a pair of abutments between which the slide part can move in the blocking position.

6. The vehicle headrest defined in claim 2 wherein the safety element is part of the second spring.

7. The vehicle headrest defined in claim 6, further comprising
    an externally accessible and manually actuatable operating element connected to the slide.

8. The vehicle headrest defined in claim 7 wherein the operating element is a push button.

9. The vehicle headrest defined in claim 7 wherein the operating element has a cam engageable with the safety element on depression of the pushbutton to shift the safety element into the releasing position.

10. The vehicle headrest defined in claim 1 wherein the support carries an element projecting radially of the axis and bearing in the rest position on the slide.

11. A vehicle headrest comprising:
    a support defining a horizontal pivot axis;
    a cushion having a front face and pivotal about the axis on the support between a use position with the face upright and a rest position with the face generally horizontal;
    a slide displaceable in a longitudinal direction relative to the cushion between a blocking position operatively engaging the cushion and preventing the cushion from pivoting about the axis from the use position into the rest position and an unblocking position permitting such pivoting;
    a spring urging the slide into the blocking position;
    a safety element engageable with the slide and displaceable in a transverse direction between a locking position operatively engaging the slide and preventing movement of the slide into the unblocking position and a releasing position permitting movement of the slide into the unblocking position; and
    a spring bearing on the safety element and urging the safety element into the locking position.

* * * * *

UNITED STATES PATENT AND TRADEMARK OFFICE
CERTIFICATE OF CORRECTION

| | | |
|---|---|---|
| PATENT NO. | : 7,669,932 B1 | Page 1 of 1 |
| APPLICATION NO. | : 11/364805 | |
| DATED | : March 2, 2010 | |
| INVENTOR(S) | : Reinhold Grönninger et al. | |

It is certified that error appears in the above-identified patent and that said Letters Patent is hereby corrected as shown below:

Title page item [75] The second inventor's name should be shown as:
-- Sven Spielmann --

Signed and Sealed this

Twenty-seventh Day of April, 2010

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,669,932 B1 |
| APPLICATION NO. | : 11/364805 |
| DATED | : March 2, 2010 |
| INVENTOR(S) | : Reinhold Grönninger et al. |

It is certified that error appears in the above-identified patent and that said Letters Patent is hereby corrected as shown below:

Title page, in Column 1, line 6, the city address of the Assignee should be changed from "Riverdale (Bronx), NY (US)" to -- Amberg, DE --

Signed and Sealed this
Fifteenth Day of March, 2011

David J. Kappos
*Director of the United States Patent and Trademark Office*